US006917290B2

(12) United States Patent
Land

(10) Patent No.: US 6,917,290 B2
(45) Date of Patent: Jul. 12, 2005

(54) ZONE DETECTION LOCATOR

(75) Inventor: Thomas Land, Ashburn, VA (US)

(73) Assignee: ITT Manufacturng Enterprises, Inc., Wilmington, DE (US)

( * ) Notice: Subject to any disclaimer, the term of this patent is extended or adjusted under 35 U.S.C. 154(b) by 95 days.

(21) Appl. No.: 10/670,305

(22) Filed: Sep. 26, 2003

(65) Prior Publication Data

US 2004/0075562 A1 Apr. 22, 2004

Related U.S. Application Data

(60) Provisional application No. 60/417,654, filed on Oct. 11, 2002.

(51) Int. Cl.[7] .................................................. H04Q 7/00
(52) U.S. Cl. ............................... 340/539.1; 340/539.11; 340/539.13; 340/539.21; 340/573.4; 340/825.36; 340/825.49
(58) Field of Search ......................... 340/539.1, 539.11, 340/539.13, 539.15, 539.21, 539.23, 539.32, 573.1, 573.4, 3.1, 5.1, 5.2, 825.36, 825.49

(56) References Cited

U.S. PATENT DOCUMENTS

| 4,494,119 | A | | 1/1985 | Wimbush |
|---|---|---|---|---|
| 4,955,000 | A | | 9/1990 | Nastrom |
| 5,051,741 | A | | 9/1991 | Wesby |
| 5,119,104 | A | | 6/1992 | Heller |
| 5,218,344 | A | | 6/1993 | Ricketts |
| 5,356,764 | A | | 10/1994 | Ovard et al. |
| 5,381,137 | A | * | 1/1995 | Ghaem et al. ............ 340/572.5 |
| 5,543,797 | A | | 8/1996 | Hochstein et al. |
| 5,745,037 | A | | 4/1998 | Guthrie et al. |
| 5,917,425 | A | | 6/1999 | Crimmins et al. |
| 5,917,449 | A | * | 6/1999 | Sanderford et al. ......... 342/457 |
| 5,987,379 | A | | 11/1999 | Smith |
| 6,040,774 | A | | 3/2000 | Schepps |
| 6,047,192 | A | * | 4/2000 | Maloney et al. .......... 455/456.2 |
| 6,144,303 | A | * | 11/2000 | Federman ................. 340/573.4 |
| 6,169,484 | B1 | | 1/2001 | Schuchman et al. |
| 6,225,906 | B1 | * | 5/2001 | Shore ....................... 340/573.4 |
| 6,269,246 | B1 | | 7/2001 | Rao et al. |
| RE37,531 | E | | 1/2002 | Chaco et al. |
| 6,396,413 | B2 | | 5/2002 | Hines et al. |
| 6,424,264 | B1 | | 7/2002 | Giraldin et al. |
| 6,424,838 | B1 | | 7/2002 | Stobbe et al. |
| 6,433,689 | B1 | | 8/2002 | Hovind et al. |

FOREIGN PATENT DOCUMENTS

| EP | 0575753 A | 12/1993 |
|---|---|---|
| JP | 63245026 A | 10/1988 |
| WO | WO 95/30970 A | 11/1995 |

* cited by examiner

*Primary Examiner*—Daryl C Pope
(74) *Attorney, Agent, or Firm*—Edell, Shapiro & Finnan, LLC

(57) ABSTRACT

A method and apparatus for a zone detection system in which assets and personnel to be monitored are assigned a transmitter that emits a transmitter signal that includes a common code and a unique code. Processing requirements associated with restricted zone monitoring are reduced by scanning received signals for the single common code or a relatively small number of common codes. Processing requirements associated with locating an individual transmitter are reduced by scanning for a single transmitter signal. Transmitter signals are relayed by sub-sector RF-relays to a centralized sector signal processing computer. One or more signal processing computers interface with a system controller that supports a centralized user interface configurable to manage one or more sectors. CDMA matched filter techniques, power signature maps, and two-dimensional/three-dimensional convolution techniques are used to efficiently detect signals and to refine the estimated location a specific transmitter or a group of transmitters.

44 Claims, 9 Drawing Sheets

ZONE DETECTION LOCATOR

CROSS-REFERENCE TO RELATED APPLICATIONS

This application claims priority from U.S. Provisional Patent Application Ser. No. 60/417,654, entitled "Zone Detection Locator" and filed Oct. 11, 2002, the disclosure of which is incorporated herein by reference in its entirety.

BACKGROUND OF THE INVENTION

1. Field of the Invention

The present invention pertains to mobile transmitter location and tracking systems. In particular, the present invention pertains to a centrally controlled tracking system used to locate and/or track material assets and/or personnel within a monitored area of control.

2. Description of the Related Art

The need to locate and track material assets and/or individuals within a predetermined monitored area of control is evident from a wide range of conventional mobile asset and/or personnel tracking systems. Typically in these systems, the asset or individual to be tracked is assigned a mobile, signal-emitting identification (ID) tag, embedded within a bracelet or other device, that is physically attached to the asset or individual to be monitored. The monitoring system, therefore, is able to track the asset/individual based radio communications received from its associated signal-emitting ID tag. Such monitoring systems vary significantly with respect to the nature of communications with the respective ID tags and the devices used to implement the chosen communication signal architecture.

Some conventional systems position at known locations interrogating transmitters/receivers that periodically transmit a poll request to one or more signal ID tags within the interrogating transmitters/receivers broadcast area. Mobile transmitter/receiver ID tags that receive a poll request signal respond by issuing a poll response signal back to the polling device. Such systems typically do not attempt to pinpoint the location of the ID tag, but instead, approximate the location of the asset/individual based upon the fixed location of the interrogating transmitter/receiver. Further, the ID tags and interrogators must both be capable of receiving and processing signals as well as generating and transmitting signals, thus increasing deployment and maintenance costs and decreasing overall system reliability due to increased complexity.

In other conventional systems, simpler devices that only receive signals are used instead of the interrogating transmitters/receivers discussed above and devices that only transmit a signal, either periodically or in response to a user initiated action, are used instead of the transmitter/receiver ID tags described above. However, the total cost of deploying and maintaining such systems remains high and the ability of such systems to simultaneously track large numbers of ID tags, or to timely track individual ID tags within a large pool of deployed ID tags remains limited. Further, such systems still rely upon a distributed network of signal processing receivers that have a fixed signal processing capacity and, therefore, are not capable of supporting large swells in ID tag movements.

Conventional tracking systems are typically limited with respect to the number of ID tags that can be simultaneously supported. Such limitations are typically due to the heavy communication traffic and/or signal processing associated with continually polling and/or processing signals received from each individual tag in the system. To handle high loads, complex, high-speed signal processing equipment is required, thus increasing system deployment costs, increasing system failures, and hence increasing down-time and maintenance costs. Often the required high-speed components must be distributed throughout the area of coverage, thereby forcing the capacity of the distributed system components to be sized on a worse-case-scenario basis (thereby increasing costs) or to accept limited capacity and/or decreased flexibility and/or compromising the ability of the system to respond to large asymmetrical shifts in ID tag populations. Such large shifts in population are most likely to occur under emergency conditions when the location tracking system is needed most.

Another deficiency associated with conventional asset/personnel tracking systems is the inability to protect against the loss, theft, or removal of a transmitter from the monitored area. Loss of ID tags is a serious concern because once the transmitter leaves the monitored area, the system control computer will be unable to determine its location. One way to mitigate the risk posed by such an event is to constantly scan for transmitters at the entrance/exit points to the monitored facility using RF-relays that are positioned at the entrances/exits of the installation. However, it is impractical in an installation with a large number of transmitters to scan for every transmitter at every entrance/exit point at a sufficiently high rate as to provide continuous, unbroken surveillance without substantially increasing the computational capability of the signal processing computer(s) tasked with monitoring these areas.

Hence, a need remains for a cost effective, high precision, modularly expandable asset/personnel tracking system that is capable of effectively safeguarding against loss of ID tag transmitter devices. The system must be capable of accurately locating an asset/person within any sized population within a monitored area, yet be comprised of cost effective, reliable and easily maintained equipment. Preferably, the system capacity would be modularly expandable from a central location and system capabilities/performance must not be adversely impacted by large shifts in the monitored ID tag population.

SUMMARY OF THE INVENTION

Therefore, in light of the above, and for other reasons that will become apparent when the invention is fully described, an object of the present invention is to reduce computer signal processing requirements associated with tracking individuals and/or assets within a monitored area.

Another object of the present invention is to reduce the complexity of transmitters and the complexity of distributed processing equipment associated with tracking individuals and/or assets within a monitored area.

Still another object of the present invention is to create a monitoring and tracking system that is modularly expandable with respect to both accuracy and area of coverage.

Yet another object of the present invention is to locate, in a timely manner, a specific transmitter from a pool that includes an unlimited number of transmitters, regardless of shifting nature of the transmitter population within the monitored area.

Still yet another object of the present invention is to support the efficient monitoring of restricted zones.

The aforesaid objects are achieved individually and in combination, and it is not intended that the present invention be construed as requiring two or more of the objects to be combined unless expressly required by the claims attached hereto.

In accordance with the present invention, a zone detection system is described in which assets and personnel to be monitored are assigned a transmitter that emits a radio frequency (RF) signal. The transmitter signal is a low power radio frequency carrier that is common to all transmitters but that is modulated by a multi-bit digital baseband sequence (or modulating code) that uniquely identifies the particular transmitter. The modulating sequence (or modulating code) is the time-multiplexed composite of a non-unique sequence common to all or a limited subset of transmitters (hereinafter referred to as a common code) and a unique identifying baseband sequence (hereinafter referred to as a unique code). Although, preferably, a unique code is unique across all transmitters, a unique code may any sequence that when combined with a common code, as described above, results in a unique modulating sequence and, hence, a unique transmitter signal.

Processing requirements associated with restricted zone monitoring are reduced by scanning received signals for a single common code within the unique modulating sequence rather than scanning received signals for each unique modulating sequence. Processing requirements associated with locating an individual transmitter are reduced by scanning received signals for a specific unique modulating sequence associated with the transmitter to be located.

In one non-limiting, representative embodiment, the single common code is replaced, and/or supplemented with a relatively small number of common codes, thereby allowing one or more transmitters supported by the zone detection system to be associated with a group in which group members, preferably, share common characteristics and/or access requirements. Using such an approach, processing requirements associated with restricted zone monitoring are increased due to the increase number of common codes, however, management of the number of common codes used allows restricted zone monitoring processing requirements to remain manageable.

An area to be monitored is divided into one or more sectors with each sector divided into one or more sub-sectors. Each sub-sector is monitored by a radio frequency (RF) signal relay (or RF-relay). Multiple sub-sector RF-relays relay received transmitter signals, received from transmitters located within their respective sub-sectors, to a sector signal processing computer. In this manner, costs are reduced by performing signal processing with a centralized signal processing computer, or group of networked signal processing computers, rather than performing signal detection/processing operations at the distributed points of signal reception. By centralizing signal detection/processing functions, the zone detection system's processing capacity can be easily tailored to meet the processing needs of a specific installation. Further, the signal processing capacity of the zone detection system can be easily expanded by enhancing the capacity of the sector level signal processing computer(s) associated with the zone detection system without upgrading sub-sector level units. Optionally, load-sharing techniques can be used to further distribute signal processing loads across a large number of low cost centralized signal processing computers.

Preferably, CDMA matched filter techniques are used to scan incoming signals using a matched filter based upon a common code or a unique modulating sequence. For efficiency purposes, a transmitter signal modulating code, preferably, includes a time multiplexed combination of a common code and a unique code (as described above), thereby assuring that a portion of the unique code portion of the modulating code is detected in each CDMA scanning cycle.

Optionally, signal strength data is collected based upon transmitter signals received at the respective signal relay devices from transmitters temporarily positioned at known points on a grid within the monitored area. The collected signal strength data is stored in a power signature map information store. During operational use of the zone detection system, two-dimensional and three-dimensional convolution techniques are used to compare the strength of transmitter signals detected by different RF-relays with the stored power signature map data to further refine the location of a specific transmitter or group of transmitters.

Using the apparatus and methods described here, a zone detection system is achieved that reduces signal computer processing requirements associated with tracking individuals and/or assets within a monitored area, reduces the complexity of transmitters and required processing equipment, is modularly expandable with respect to both accuracy and area of coverage, is capable of locating, in a timely manner, a specific transmitter from a pool that includes an unlimited number of transmitters, regardless of shifts in the transmitter population within the monitored area, is capable of monitoring the location of one or more specific transmitters over time, and is capable of efficiently monitoring restricted zones.

The above and still further objects, features and advantages of the present invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
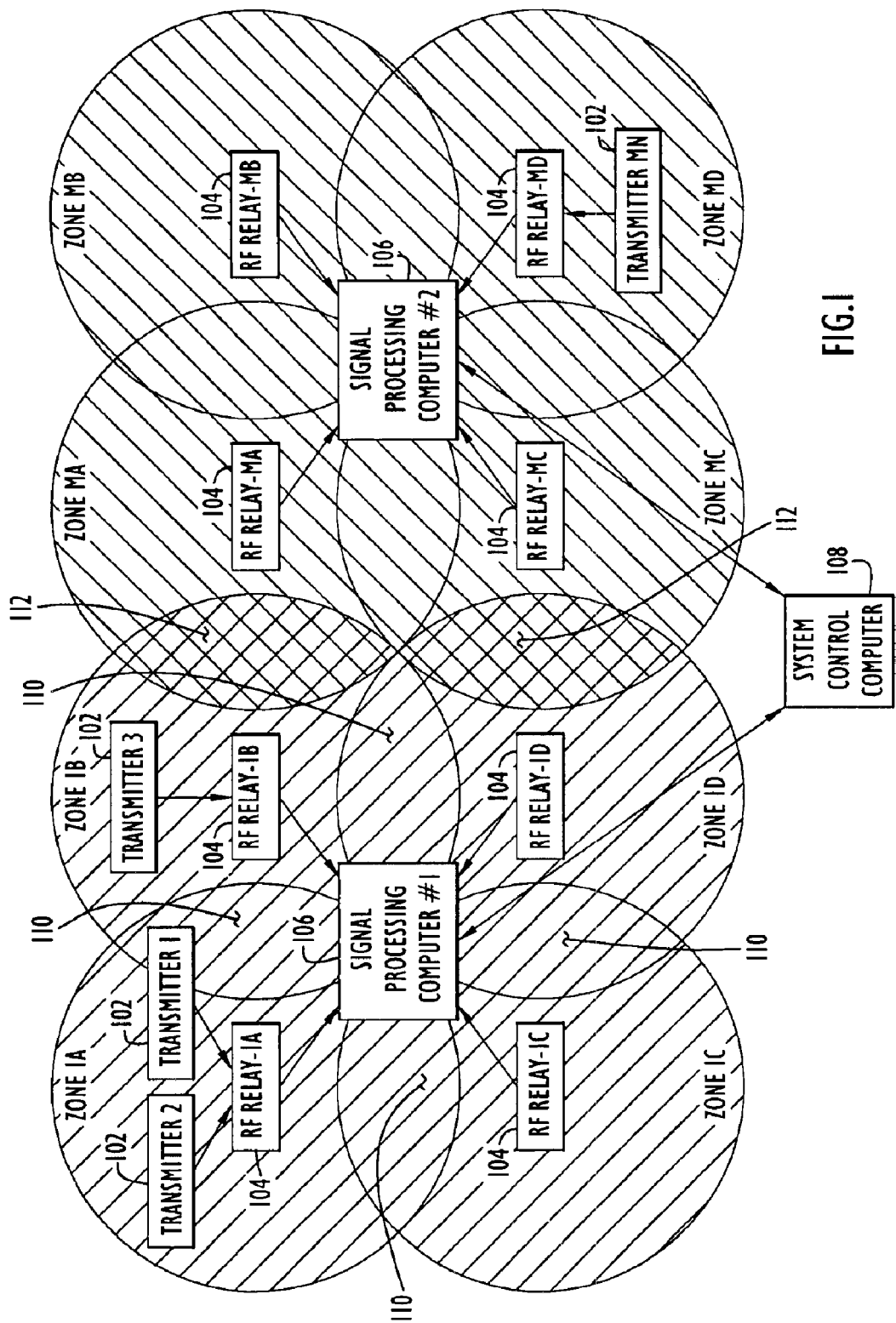
FIG. 1 is a schematic of a zone detection system architecture with overlapping sub-sector and sector detection zones in accordance with an exemplary embodiment of the present invention.

Preferred embodiments according to the present invention are described below with reference to the above drawings, in which like reference numerals designate like components.

FIG. 1 presents a representative system architecture for a zone detection system that includes transportable, low-power, battery operated pseudonoise spread spectrum radio frequency (RF) transmitters 102, and distributed low-cost RF signal relays (or RF-relays)104, that receive signals from the respective transmitters and relay the received signals to one or more signal processing computers 106. The system further includes a system controller 108 that is used to integrate data received from the respective signal processing computers 106 and to provide a common user interface for the zone detection system.

For example, an RF transmitter 102 can be embedded in a wristband or badge and attached by a guardian to a child in a shopping mall. Should the child and guardian become separated, the location of the child can be determined by the monitoring system by locating the child's RF transmitter 102 based upon a unique signal emitted by the transmitter.

In a preferred embodiment the transmitter transmits a low power radio frequency carrier that is common to all transmitters but that is modulated by a multi-bit digital baseband sequence (or signal modulating code) that uniquely identifies a particular transmitter. The signal modulating code is configured such that it is the time-multiplexed composite of a non-unique sequence common to all or a limited subset of transmitters (i.e., a common code) and a uniquely identifying baseband sequence (i.e., a unique code). The transmitted signal power is low such that it is receivable by receiving equipment only within a fixed range (e.g., 150 feet). Low power transmission helps to reduce the power consumption, cost, and size of transmitter equipment.

Throughout a predetermined monitored area of coverage, RF-relays 104 are deployed and installed such that each relay is capable of relaying signals received from transmitters within a reception area (or zone) of the RF-relay (i.e., a sub-sector) to a designated signal processing computer 106 that supports multiple sub-sectors (i.e., a sector). As shown in FIG. 1, RF-relay-1A receives signals transmitted by transmitters within reception zone 1A, RF-relay-1B receives signals transmitted by transmitters within reception zone 1B, RF-relay-1C receives signals transmitted by transmitters within reception zone 1C, RF-relay-1D receives signals transmitted by transmitters within reception zone 1D, RF-relay-MA receives signals transmitted by transmitters within reception zone MA, RF-relay-MB receives signals transmitted by transmitters within reception zone MB, RF-relay-MC receives signals transmitted by transmitters within reception zone MC, and RF-relay-MD receives signals transmitted by transmitters within reception zone MD. In a preferred embodiment, the sub-sectors supported by a group of RF-relays that report to a common signal processing computer 106 overlap in sub-sector overlap area 110 so that an individual transmitter signal is received by multiple RF-relays positioned within the sector. Further, a signal emitted by a transceiver in a sector overlap area 112 is received by RF-relays reporting to two separate sector signal processing computers 106.

In one non-limiting, representative embodiment, an RF signal received at an RF-relay is down-converted by the RF-relay to a lower frequency and transmitted over a hard wire path to a signal-processing computer 106, although variations on this are possible that do not substantially change the nature of the invention. For example, the relay path to the signal-processing computer can be implemented via a radio link that does not interfere with transmitter/relay communication.

Relays 104 are arranged such that there is complete coverage of the predetermined monitored area (e.g., a mall, fair-grounds, prison, etc.), thus dividing the monitored area into sub-sectors with at least one relay servicing each sub-sector. Additional (separate) relays can be stationed at exits and other locations to provide entrance/exit monitoring and/or security for restricted areas (or alert zones).

Note that FIG. 1 provides a simplified illustration showing only four RF-relays per signal processing computer. In a preferred embodiment, many more RF-relays are assigned to one signal processing computer to efficiently use signal processing computer capacity and/or to increase the number of/decrease the size of the respective overlap areas. Further, despite the relatively uniform overlapping sub-sectors depicted in FIG. 1, the degree of overlap between sub-sectors serviced by their respective RF-relays can vary significantly. For example, a transmitter signal may be received by significantly more than the one or two RF-relays indicated by FIG. 1 due to a complex assortment of asymetric overlap areas supported by the respective RF-relays.

The number of relays used and the degree of overlap between sub-sectors in any specific deployment or portion of a deployment area is a cost versus accuracy deployment consideration. The accuracy to which the location of a transmitter can be determined increases with the number of RF-relays that receive a signal emitted by the transmitter; however, signal processing computer 106 processing requirements also increase with an increase in the number of RF-relays that receive a single signal. Therefore, deployment costs increase due to the increased number of RF-relays deployed and due to the increased number of signal processing computers required to process output from the increased number of RF-relays. In one non-limiting, representative embodiment the signal processing capacity of a signal processing computer is enhanced by replacing the single signal processing computer with a cluster of load sharing, low cost computers.

Sub-sectors are grouped into sectors such that a signal-processing computer receives signals from every RF-relay (sub-sector) in its sector. A monitored area may include one or more sectors, each equipped with a signal-processing computer. Further, as indicated in FIG. 1 (112), sectors supported by different signal processing computers can overlap.

In one representative, non-limiting embodiment, a signal-processing computer 106 is equipped with a multichannel analog-to-digital converter (one channel per RF-relay, i.e., one channel per sub-sector) and signal detection software capable of determining (upon command) the presence or absence of a particular transmitter within its several sub-sectors.

Multiple signal processing computers may be networked to a single system control computer 108 in the case of large installations or the system control computer's role may be integrated into the signal-processing computer in the case of a single sector implementation.

In operation, a transmitter is assigned to an asset or individual, and a common code/unique code pair that uniquely identifies the transmitter is supplied to the system control computer via a user interface supported by the system control computer/system controller. In the event that it is necessary to locate the transmitter, the system control computer operator invokes a search via the system control computer user interface. To implement the requested search, the system control computer sends a search request to each signal processing computer to instruct each respective signal processing computer to search for a transmitter identified by a specified common code/unique code pair. In response, each signal processing computer will scan each RF-relay channel using signal matching to determine the presence or absence of a target signal (i.e., a signal modulated with a signal modulating code that contains (i.e., is based upon) the specified common code/unique code pair) in each of its sub-sectors. Information regarding the presence or absence of the target signal, and the received signal strength, is then returned to the system control computer for integration. Nominally, the data resulting from this process will result in a composite picture that can be used to display the general location of the signal source(s) and, therefore, a general location of the individual/asset being searched for. Preferably, the data will be integrated and a single high-probability transmitter location is determined.

Prior to operation, as part of the installation process and/or as part of a regular maintenance process, the area to be monitored is calibrated to provide a calibrated power signature map of the area to be monitored. That is, for a signal transmitted from discrete transmitter locations on a grid within the monitored area, the power of the signal as received at one or more RF-relays (i.e. the grid point's spatial power signature) is measured and stored in an accessible information store. In operation, this power signature information store data is correlated with signal strength information reported to the system control computer by the respective signal processing computers to generate a probability estimate for the location of a transmitter at or near a particular grid location.

Loss, theft, or removal of a transmitter from the monitored area is a concern with respect to the location monitoring system described here, because once a transmitter leaves the monitored area, the system control computer will be unable to ascertain its location. One way to mitigate the risk posed by such an event is to constantly scan for transmitters at the entrance/exit points to the monitored area/facility using RF-relays that are positioned at the entrances/exits of the monitored area/facility. However, it is impractical in an installation with a large number of transmitters to scan for every transmitter signal at every entrance/exit point at a sufficiently high rate as to provide continuous, unbroken surveillance without substantially increasing the computational capability of the signal processing computer(s) tasked with monitoring these areas. To address this risk, transmitters associated with the subject invention use a time-multiplexed combination of a common code and a unique code assigned to the transmitter to generate a unique signal modulating code used to modulate the signal transmitted by a particular transmitter.

Scanning for a single common code portion of the unique signal modulating codes used by multiple transmitter signals, rather than scanning for each individual signal modulating code within the respective signals, greatly reduces the signal processing capacity required to perform zone monitoring. Zone monitoring for all transmitters assigned the same common code is performed by scanning for a single common code portion of the respective signals' signal modulating code. Introduction of a common code portion to the signal design alleviates the need for expensive, high performance computers to seek for every signal modulating code at every entrance/exit. Signals received by signal processing computers 106, via one or more RF-relays 104, are constantly and repetitively scanned by the respective signal processing computers 106 for one or more common codes within the received baseband sequence. Upon detection of a common code, information related to the detected signal is relayed to the system controller 108. If the system controller determines that the detected signal was received from a location for which the common code is not authorized, the system control computers issues an installation-specific alarm.

Figure 2:
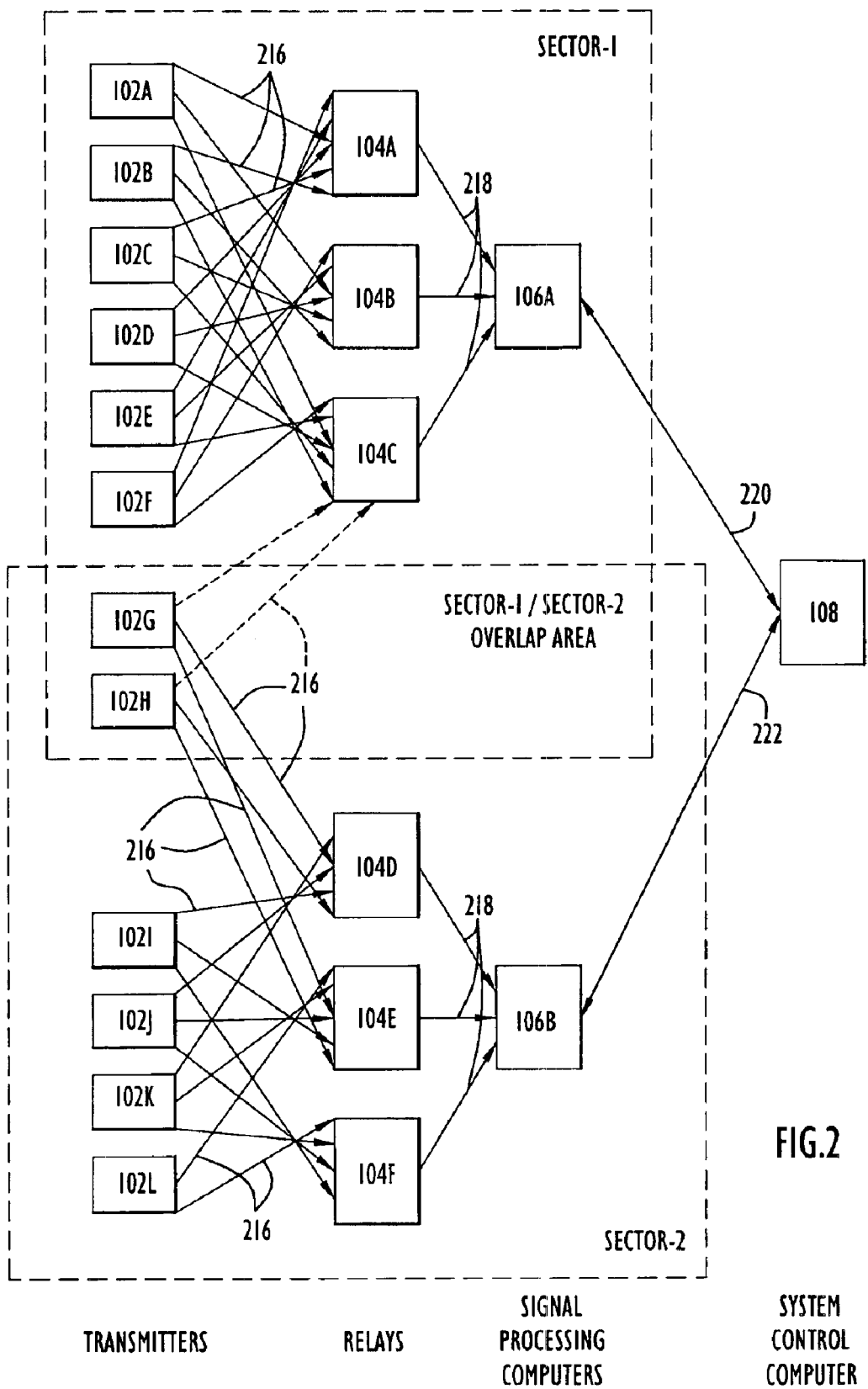
FIG. 2 is a block diagram of a zone detection system architecture indicating representative information flows between sub-sector and sector components in accordance with an exemplary embodiment of the present invention.

FIG. 2, presents transmitters 102A through 102L, relays 104A through 104F, and signal processors 106A and 106B associated with a non-limiting, representative zone detection system used to monitor an area divided into two sectors, hereinafter referred to as sector-1 and sector-2 monitored by a common system control computer 108.

Sector-1 includes a sector signal processing computer 106A that receives relayed signals from three sector-1 sub-sector relays, namely relay 104A, 104B, and 104C. The sector-1 sub-sector relays receive signals from a number of mobile transmitters (in this example, 6) located within sector 1 (namely 102A, 102B, 102C, 102D, 102E and 102F), and two mobile transmitters (namely 102G and 102H) located in areas of overlap between sector-1 and sector-2. Sector-2 includes a sector signal processing computer 106B that receives relayed signals from three sector-2 sub-sector relays, namely relay 104D, 104E, and 104F. The sector-2 sub-sector relays receive signals from four mobile transmitters located within sector 2 (namely 102I, 102J, 102K, 102L), and the two mobile transmitters introduced above (namely 102G and 102H) located in areas of overlap between sector-1 and sector-2.

Information and processing of signals within the zone detection system of the present invention is performed in the same manner for each transmitter deployed within the monitored area. For example, with respect to sector-1 as depicted in FIG. 2, each transmitter located in sector-1 and the sector-1/sector-2 overlap region (i.e., transmitters 102A–102F and 102G–102H, respectively) emits a transmitter signal 216 that is received, due to the physical location of the respective transmitters, by one or more of sector-1 relays 104A, 104B and 104C. Each sector-1 relay transmits via a cable based or radio based communication channel, established with the sector-1 signal processing computer 106A, all transmitter signals 218 received by the relay. Signal processing computer 106A scans each channel, as described above, to search for common codes and/or unique signal modulating codes (as described above) within the relayed transmitter signals and to determine the strength of the transmitter signal received, as described above. This detected signal information is relayed via a communication connection 220 established between the signal processing computer and the system control computer. Further, the sector-1 signal processing computer 106A communicates with system control computer 108 via connection 220 to receive common codes, unique codes and/or signal modulating codes for transmitters for which the signal processing computer is to search, as well as to receive configuration parameters and software updates.

Upon detecting a common code within a relay channel, the signal processing computer transmits information related to the signal (e.g., the ID of the relay channel upon which the signal is received and the detected common code) to the system controller. The system controller uses the information received to access an information store that correlates common codes with restricted areas (or alert zones) and alert levels based upon the relay that detected the signal and/or a further approximation of the location of the transmitter determined based upon the strength of the detected signal. If, based upon the common code of the detected signal the system controller determines that a transmitter is within an area restricted to the transmitter, the system controller issues an appropriate alert via the system control computer user interfaces and/or activates other alarms consist with the level of the alert.

Upon detecting a signal modulating code (i.e., a combination of a common code and a unique code) associated with a transmitter to be located, the signal processing computer transmits information related to the signal (e.g., the common code, the unique code, the ID of the relay channel upon which the signal is received, the signal strength, etc.) to the system controller. The system controller uses two-dimensional and/or three-dimensional correlation techniques to correlate relay signal detection information received from one or more RF-relays with signal strength measurement data stored from points throughout the monitored area, to estimate the location of the transmitter. Once the location of the transmitter is determined the location is presented via a system controller user interface, such as a display.

System controller 108 provides a user interface that allows the user community to interact with the zone detection system. Such interaction includes: associating individual transmitters with information pertaining to the resource or individual transmitters to which the transmitter is attached; assigning common and unique codes to a transmitter, generating appropriate alerts in response to a signal processing computer detecting a transmitter in a restricted area; searching for specific transmitters that are identified manually by a user or automatically in accordance with a user specified program file; and presenting search results using text coordinates, a mapped graphical display, and/or recorded log.

Figure 3:
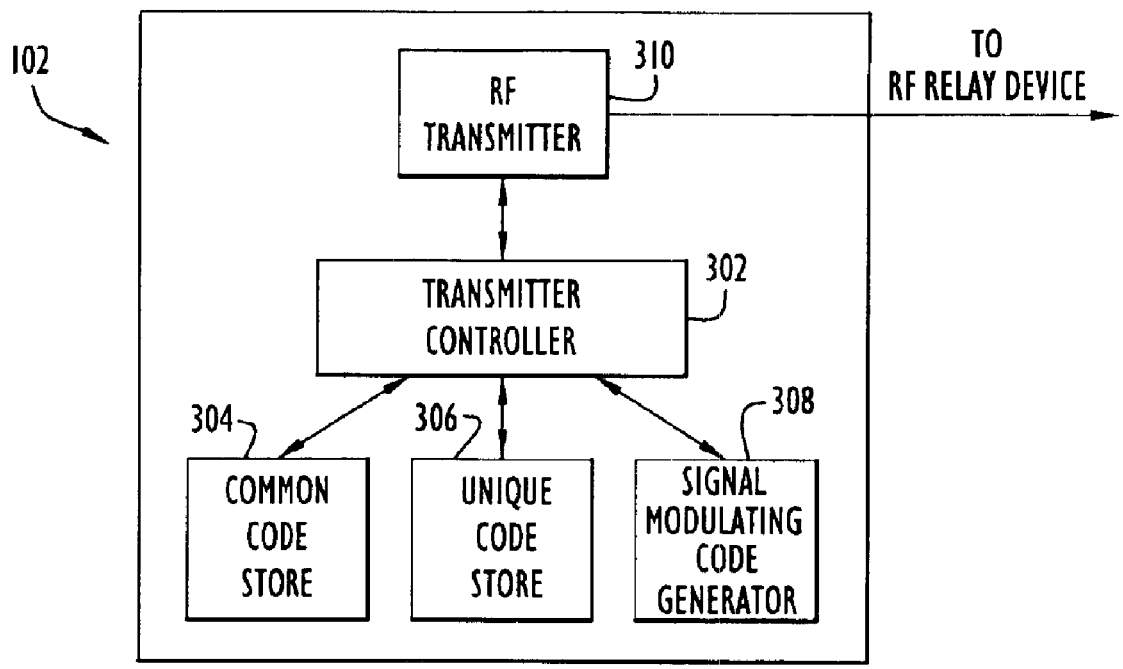
FIG. 3 is a block diagram of a representative transmitter in accordance with an exemplary embodiment of the present invention.

FIG. 3 is a block diagram that depicts a non-limiting, representative embodiment of transmitter 102, shown generally in FIG. 1. Transmitter 102 includes a transmitter controller 302 in communication with a common code store 304, a unique code store 306, a signal modulating code generator 308, and an RF transmitter 310.

Common code store 304 is used to store an assigned code common to all transmitters within the zone detection system, or to a subgroup of transmitters, to which the transmitter belongs, that share common access requirements. Unique code store 306 is used to store a unique code assigned to the transmitter, as described above. Signal modulating code generator 308 generates a signal modulating code based upon the stored common code and stored unique code, as described above. Signal modulating code generator 308 may combine the common and unique codes in a suitable manner to generate the signal modulating code (e.g., via concatenation, various multiplexing schemes, etc.). Preferably, the signal modulating code is generated by time multiplexing the common code with the unique code. By generating the signal modulating code in such a manner, the transmitter controller 302 can use the generated signal modulating code to generate a unique baseband sequence that includes the common code and the unique code associated with the specific transmitter. Preferably, the signal processing computers used by the zone detection system use CDMA matched filter techniques to locate the signal modulating code and/or a common code portion of the signal modulating code in a received signal. In such a non-limiting, representative embodiment, using a signal modulating code that is a time multiplexed combination of a common code and a unique code increases matched filter search efficiency by assuring that a portion of the unique code is processed within a single CDMA search cycle.

Transmitter controller 302 oversees generation of the transmitter signal and transmission of the transmitter signal via transmitter 310 to sub-sector RF-relay devices within broadcast range. Transmitter 102 can be pre-configured with a common code, a unique code, signal modulating code generator algorithms, and transmission control information. Transmitter 102, associated with the present invention, is preferably pre-configured to broadcast its associated transmitter identification signal on a periodic and/or continuous basis. Alternatively, a transmitter's common code, unique code, signal modulating code generator algorithms, and/or transmission control information can be configured via an external interface. Preferably, the invention uses low-cost one-way transmitters and receive-only RF-relays, thereby greatly reducing deployed equipment costs.

Figure 4:
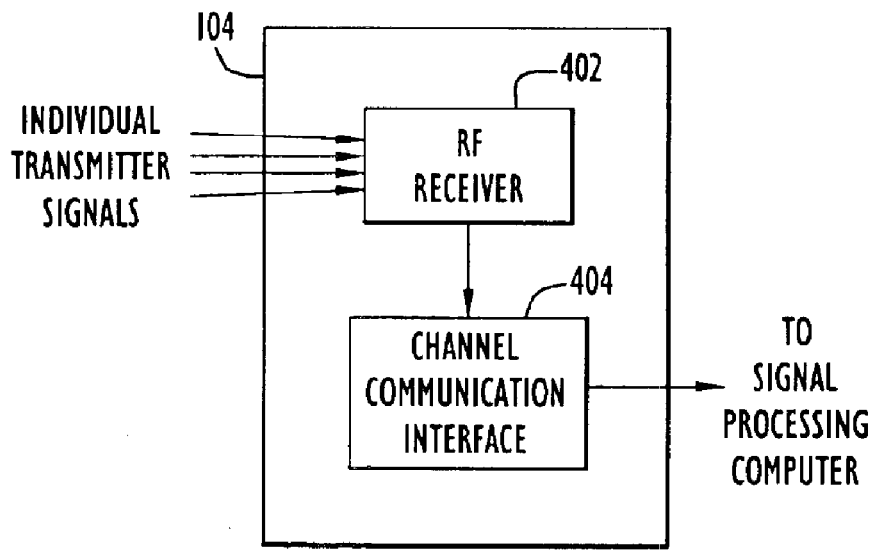
FIG. 4 is a block diagram of a representative relay in accordance with an exemplary embodiment of the present invention.

FIG. 4 is a block diagram that depicts a non-limiting, representative embodiment of RF-relay 104, shown generally in FIG. 1. RF-relay 104 includes an RF receiver 402 and a channel communication interface 404.

Receiver 402 is used to receive signals transmitted from any number of transmitters within broadcasting range of the RF-relay. Channel communication interface 404 redirects the received signals via an established communication channel to a designated signal processing computer 106 (FIG. 1). In one non-limiting embodiment, the channel communication interface down-converts received transmitter radio frequency (RF) signals to a lower frequency and retransmits the converted signals to a designated signal processing computer via a cable based communication channel. In another non-limiting embodiment, the channel communication interface converts received transmitter radio frequency (RF) signals to another radio frequency and retransmits the converted signals to a designated signal processing computer via a non-interfering radio based communication channel.

RF-relay 104 can be pre-configured with a fixed communication protocol/interface and, depending upon the communication approach used, the RF-relay can be pre-configured with an assigned signal processing computer address. Alternatively an external interface, such as a cable interface port, can be used to configure the RF-relay device, as needed.

Figure 5:
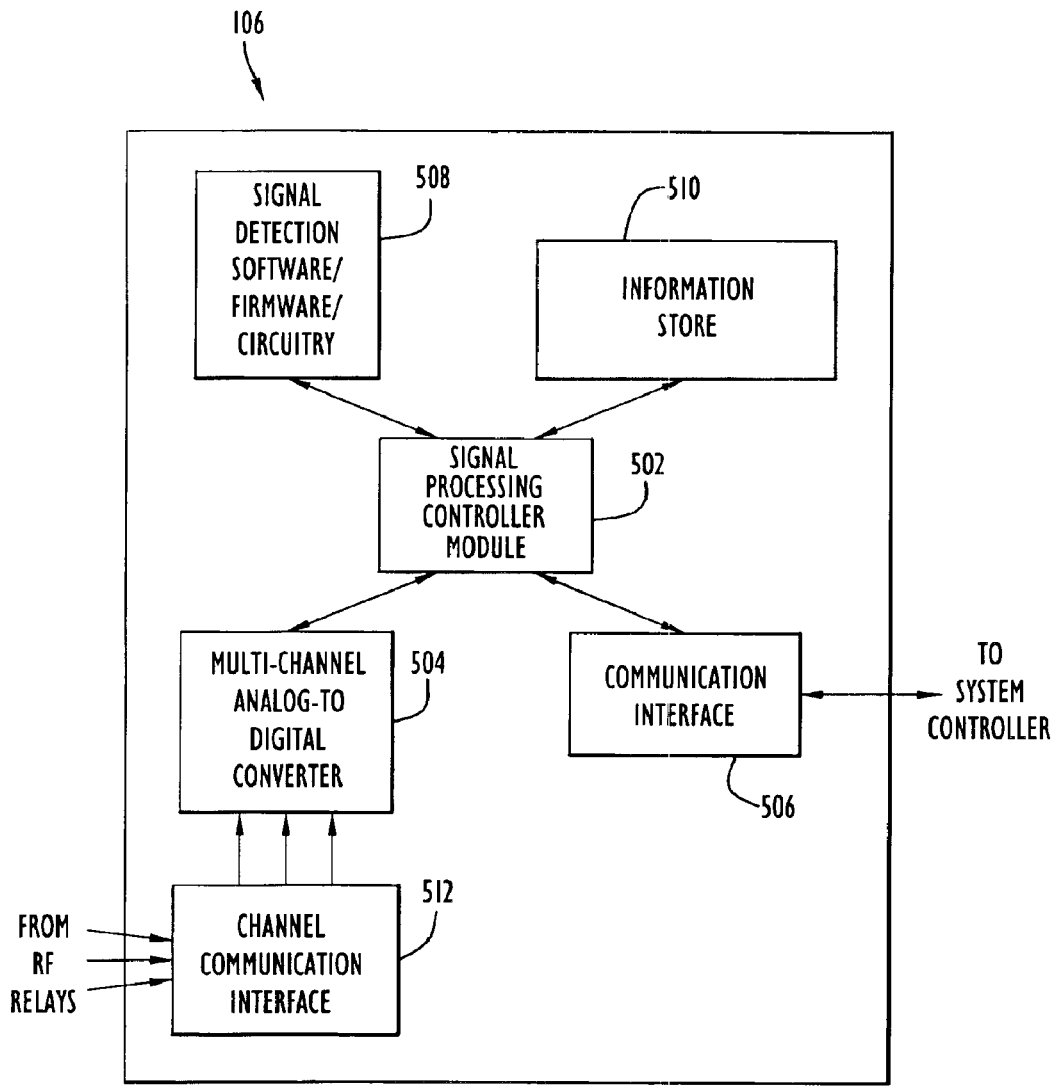
FIG. 5 is a block diagram of a representative signal processor controller in accordance with an exemplary embodiment of the present invention.

FIG. 5 is a block diagram that depicts a non-limiting, representative embodiment of signal processor controller 106 shown in FIG. 1. Signal processor controller 106 includes a signal processing controller module 502 in communication with a multi-channel analog-to-digital converter 504 and a communication interface 506 to the system controller 108 (FIG. 1) for the zone detection system. Further, signal processing controller module 502 has access to signal detection software/firmware/circuitry 508 and access to an information store 510 containing common codes, unique codes and signal modulating codes. Further, multi-channel analog-to-digital converter 504 receives analog channel signals from channel communication interface 512 that supports channel based communication between the signal processing computer and one or more RF-relays 104 (FIG. 1), described above with respect to FIG. 4, wherein each RF-relay communicates with the signal processing computer via a separate communication channel 218 FIG. 2).

In operation, relayed signals are received from one or more RF-relays via communication channels established between the respective RF-relays and the signal processing computer channel communication interface 512. Preferably, signals received from an individual RF-relay are received upon a single communication channel dedicated to the receipt of signals from that specific RF-relay. In this manner, the origin of a signal is known based upon the communication channel upon which the signal is detected. Channel communication interface 512 conveys received analog channel signals to multi-channel analog-to-digital converter 504 which converts the respective analog channel signals to digital streams and provides the respective digital streams to signal processing controller module 502.

Signal processing controller module 502 continually scans the received digitized communication channel data using signal detection software/firmware and/or related specialized circuitry 508 to scan the incoming data streams for common codes and/or unique codes. Specifically, the signal processing controller module 502 continually scans the incoming digitized streams to locate common codes, unique codes and/or multiplexed combinations of a common/unique codes (i.e., signal modulating codes) identified by the system controller 108 (FIG. 1) and stored within information store 510. Digitized channel data streams can be scanned in sequence and/or in parallel, depending upon the configuration of signal processor 502 and/or the configuration of signal detection software/firmware/circuitry 508. If a designated code is detected, information related to the detected signal is transmitted from signal processing controller module 502 to system controller 108 via communication interface 506.

If signal processing computer 106 receives a request from system controller 108 via communication interface 506 to locate a specific signal modulating code (i.e., a common code and unique code combination, as described above), the signal processing controller stores the related signal modulating code, common code and/or unique code and proceeds to scan, either sequentially or in parallel, incoming digitized RF communication channel data streams to detect the respective signal modulating codes. If a designated code is detected, information related to the detected signal (preferably including the ID of the detecting relay, the common code, the unique code and a measure of the detected signal's strength) is transmitted from signal processing controller module 502 to system controller 108 via communication interface 506.

Preferably, the signal processing controller uses CDMA matched filter techniques with the matched filters based upon time multiplexed signal modulating codes, as described above. When such CDMA matched filter techniques are used, a match between the current filter and an incoming data stream produces a measure of the strength of the signal received at the RF-relay from which the signal was relayed. Further, using a time multiplexed transmitter signal increases matched filter search efficiency by assuring that a portion of the unique code is processed within a single CDMA search cycle.

As indicated in FIG. 5, a signal processing computer is configured to maintain two-way communication with a system controller. This communication path allows the signal processing computer to receive updates to stored signal modulating codes, stored common codes, stored unique codes, stored signal detection processing software/firmware 508, and/or other processing parameters.

Figure 6:
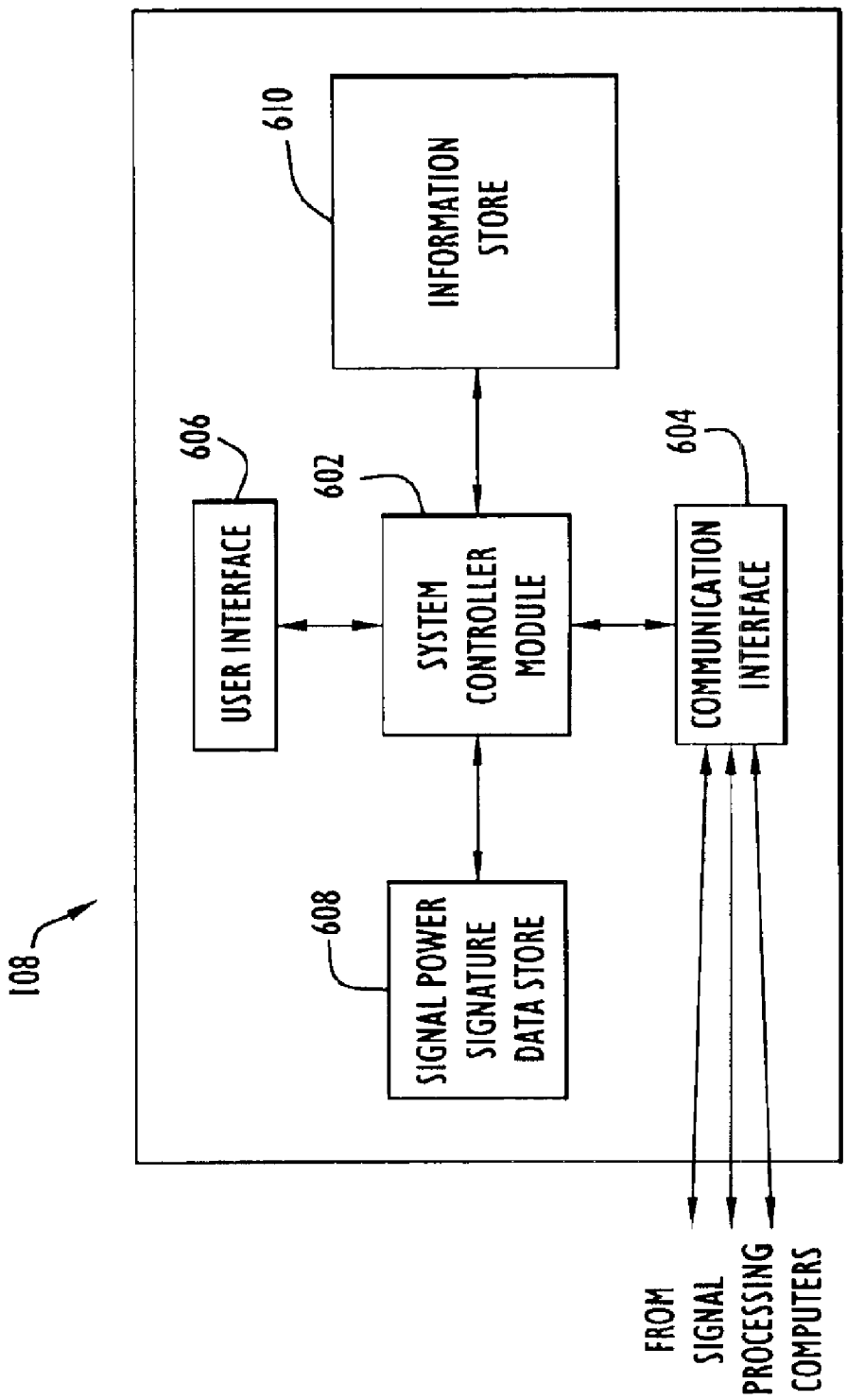
FIG. 6 is a block diagram of a representative system controller in accordance with an exemplary embodiment of the present invention.

FIG. 6 is a block diagram that depicts a non-limiting, representative embodiment of system controller 108 shown in FIG. 1. System controller 108 includes a system controller module 602 that communicates with one or more signal processing computers via a communication interface 604 and communicates with users via a user interface 606. System controller module 602 further communicates with a signal power signature data store 608 and an information store 610.

Signal power signature data store 608 contains for every transmitter location on a grid within the monitored area, received signal strength measurements (i.e. spatial power signature) associated with the one or more RF-relays within the reception area of a transmitting transmitter. In operation, this power signature map is correlated (using 2-dimensional and/or 3-dimensional correlation techniques) with the detected signal strength information received from one or more RF-relays to determine the probability that a transmitter is located at or near a particular grid location. This generated probability information can be displayed graphically to users via the user interface 606.

Information store 610 associates common codes, unique codes and/or signal modulating codes with their respective transmitters. Information store 610 is used to further associate transmitters with attribute information regarding the person or resource to which each transmitter is assigned. For example, common codes are preferably stored in association with a name and description of the group and restricted physical areas and/or relay ID's (e.g., associated with exits and/or prohibited areas) for which an alert should be initiated upon detecting the identified common code. Unique codes, common codes and signal modulating codes are preferably stored in association with the names of individuals and/or descriptions of assets to which a specific transmitter has been assigned. In operation, the system controller uses information store 610 to locate assigned transmitter codes associated with information input by users via the user interface and to translate code information received from signal processing computers into information for presentation to users via the user interface. Further, information store 610 is used to assure that newly generated common codes, unique codes, and resulting signal modulating codes are not already in use.

Communication interface 604 supports information exchange between signal processing computers 106 (FIG. 1) and the system controller. Depending upon the physical configuration of a zone detection system, however, the nature of communication interface 604 can vary. For example, if the system controller is co-located with a signal processing computer within a single computational device, communication interface 604 is implemented as an internal interface between the signal processing computer and the system controller. However, if the system controller and a signal processing computer with which the system controller communicates are implemented on separate computational devices, communication interface 604 includes an external physical interface, such as a cable or radio based network interface. Communication interface 604 can include any combination of software, cable and/or non-interfering radio communication links between the system controller module and the respective sector signal processing controllers.

User interface 606 provides a command line and/or graphical user interface that allows an authorized user community to interact with the zone detection system. For example, user interface 606 allows a user to introduce a new transmitter, common code, and/or unique code into the zone detection system. Further, user interface 606 can allow a user or technician to associate persons/resources with codes/transmitters, specify one or more transmitters to locate by describing the group, person or resource associated with the one or more transmitters, input location/signal strength map information, and/or distribute updated signal matching algorithms, two-dimensional/three-dimensional convolution algorithms, etc.

Figure 7:
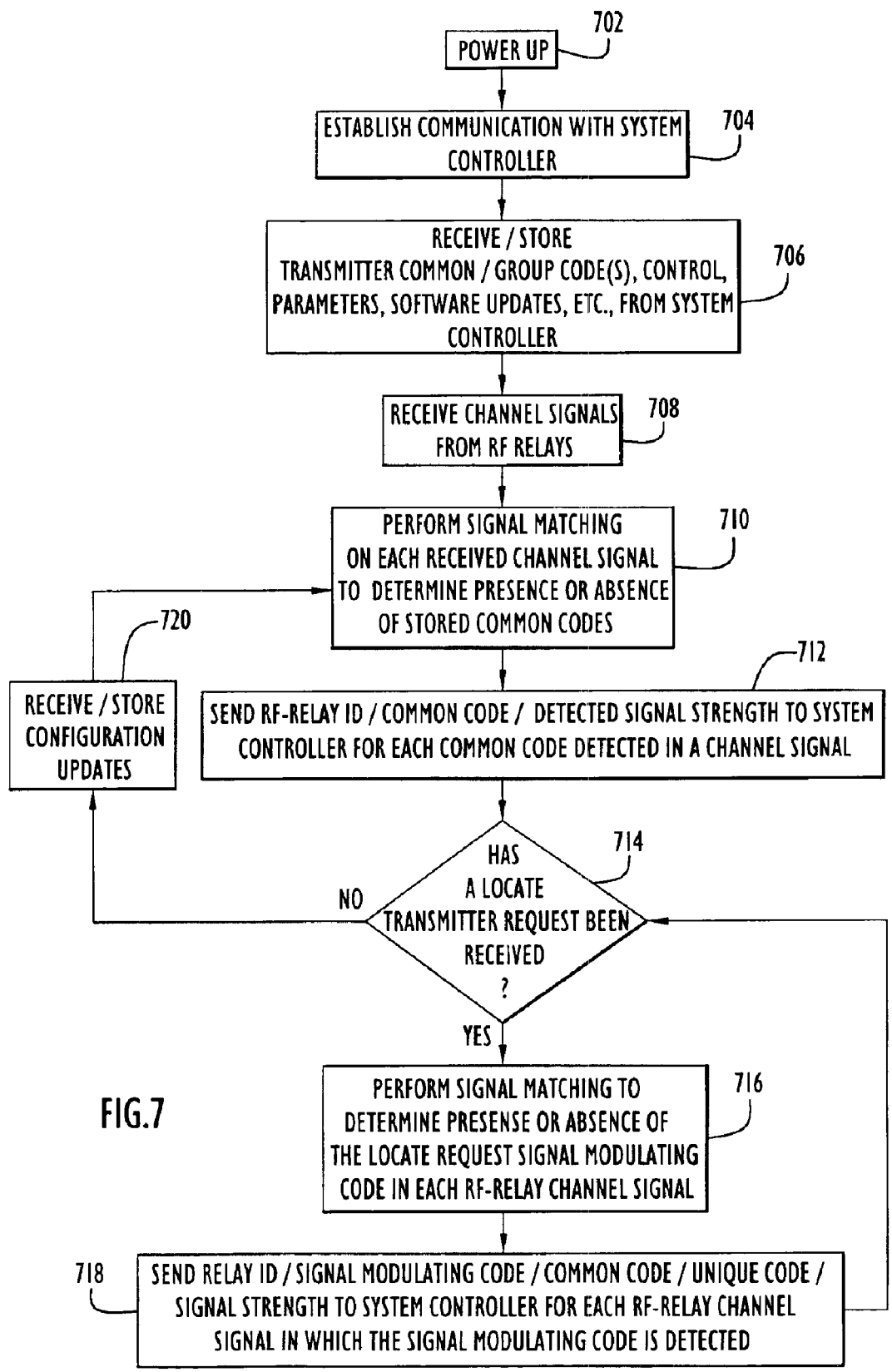
FIG. 7 is a process flow diagram depicting representative activities performed by a signal processor in accordance with an exemplary embodiment of the present invention.

FIG. 7 is a process flow diagram depicting activities performed by a signal processing computer 106 within the zone detection system architecture described with respect to FIG. 1. As shown in FIG. 7, upon powering up, at step 702, a signal processing system establishes communication, at step 704, with the system controller 108 (FIG. 1) and receives and stores, at step 706 one or more transmitter common codes, control parameters, and/or software updates to configure the signal processing system for operation within the zone detection system. Once initiated and configured, the signal processing computer proceeds to receive, at step 708, relayed transmitter signals via communication channels established with RF-relays 104 (FIG. 1) assigned to the signal processing computer, as described above. At step 710, the signal processing computer performs matched filter scanning of the digital stream associated with each RF-relay channel, as described above, to determine the presence or absence of stored common codes received from the system controller 108 (FIG. 1) at step 706. If a common code is detected, an RF-relay ID (e.g., an identifier associated with a specific RF-relay or an identifier of a communication channel between the signal processing computer and a specific RF-relay), common code, and preferably the signal strength of the detected signal is transmitted, at step 712, to the system controller for each common code detected in each RF-relay channel.

Upon completing a scan of one or more RF-relay channels for one or more common codes, the signal processing computer will check to see, at step 714, if a request to locate a specific transmitter that transmits a specific signal modulating code (i.e. preferably a time multiplexed combination of a common code and a unique code) has been received from the system controller. If such a request has been received, the signal processing computer performs, at step 716, matched filter scanning of the digital stream associated with each RF-relay channel, as described above, to determine the presence or absence of the signal modulating code contained in the locate request received from the system controller. If the signal modulating code is detected, the RF-relay ID, signal modulating code (or common code/unique code pair), and preferably the signal strength of the detected signal is transmitted, at step 718, to the system controller for each RF-relay channel upon which the signal modulating code is detected. Upon scanning all RF-relay channels for the specified signal modulating code, processing proceeds to step 714 to check whether additional locate requests are pending.

If the signal processing computer determines, at step 714, that no locate requests are pending, the signal processing computer receives and stores, at step 720, any configuration updates, such as new common codes and/or software updates, and proceeds to scan for stored common codes at step 710.

Figure 8A:
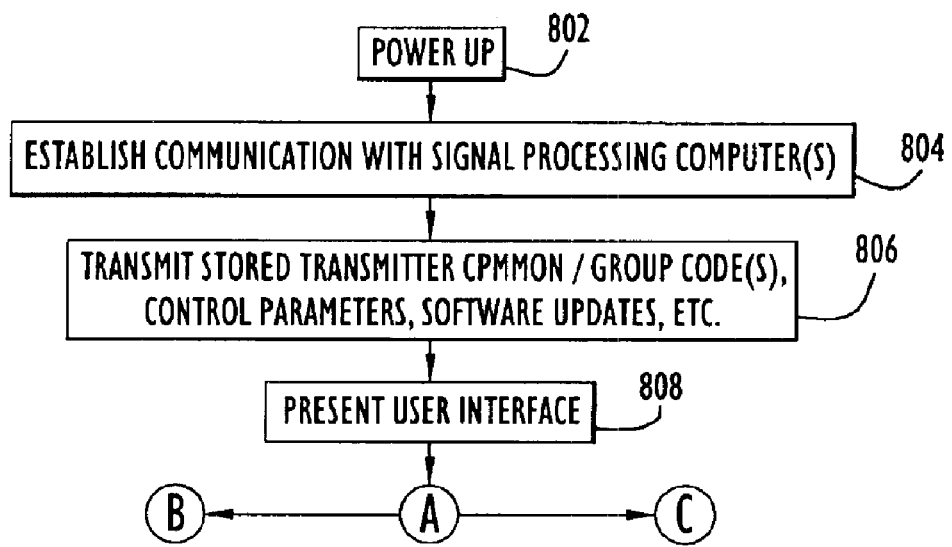
FIGS. 8A–C are a process flow diagram depicting representative activities performed by a system controller in accordance with an exemplary embodiment of the present invention.
Figure 8B:
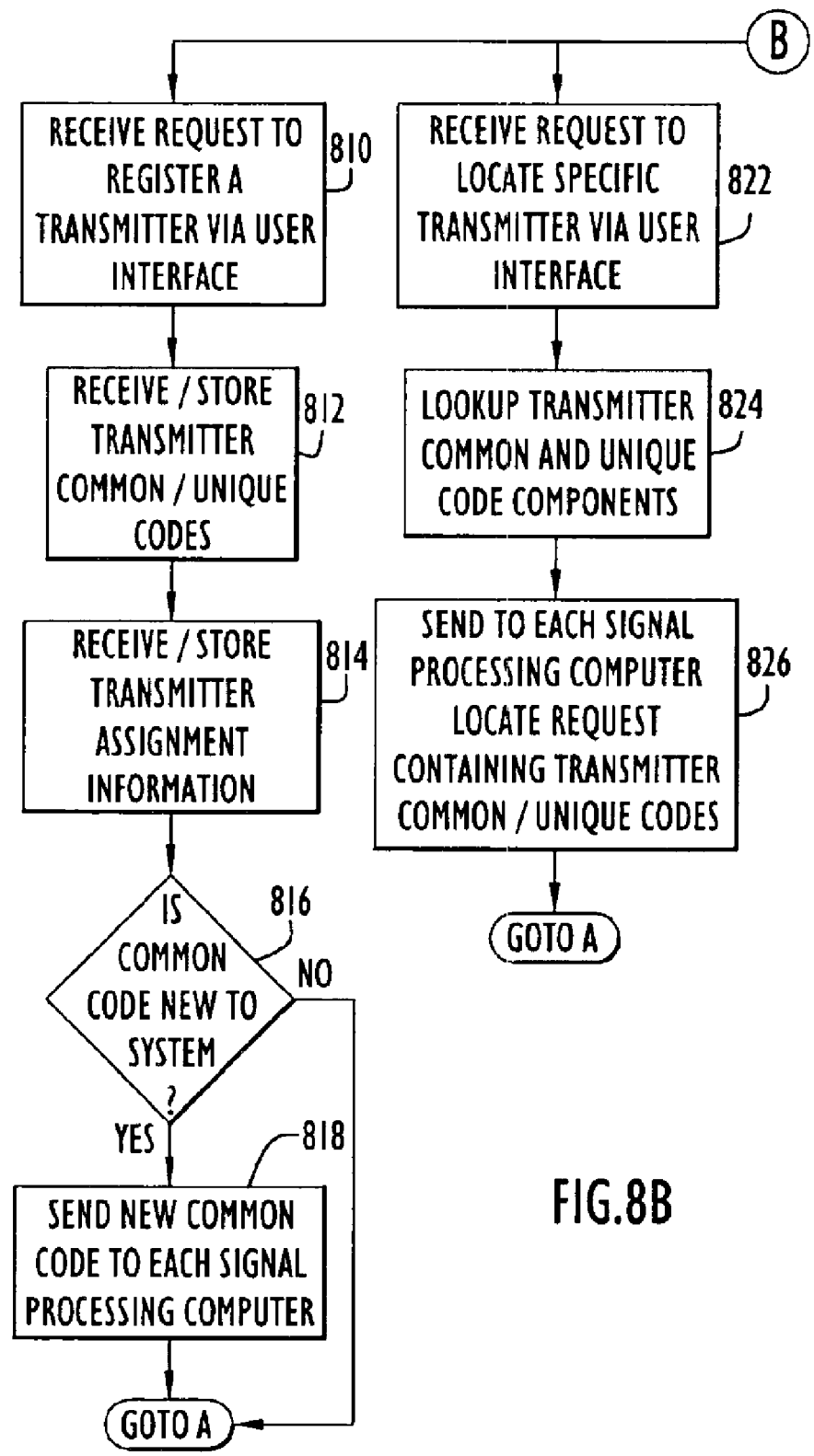
Figure 8C:
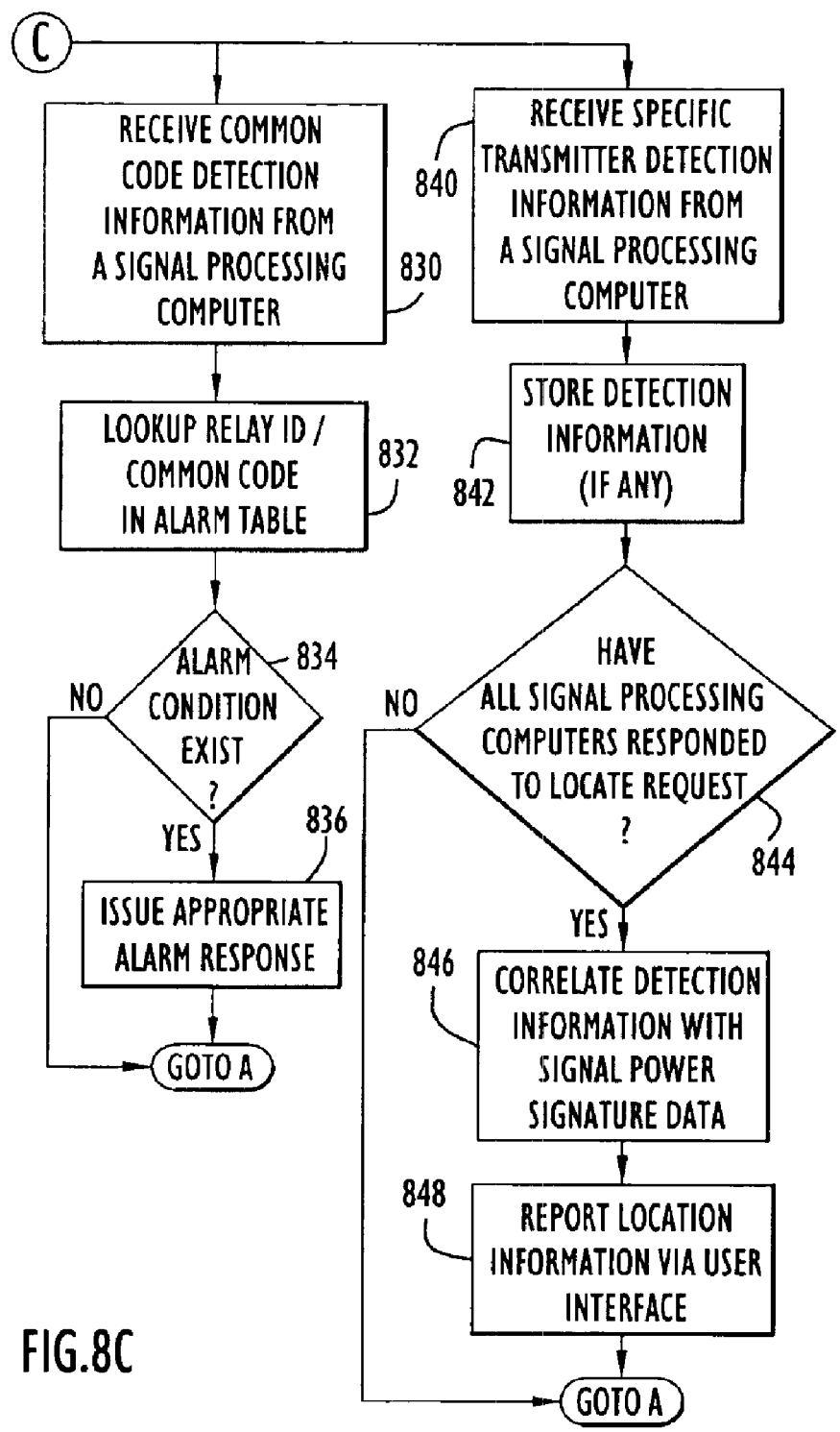

FIG. 8 is a process flow diagram depicting representative activities performed by a system controller in accordance with an exemplary embodiment of the present invention. As shown in FIG. 8, upon powering up, at step 802, the system establishes communication, at step 804, with one or more signal processing computers 106 (FIG. 1) and sends, at step 806, common codes, configuration parameters and/or software updates to the respective signal processing computers with which communication is established. Once the zone detection system is initiated, the system controller presents, at step 808, a user interface by which the user community accesses and uses the zone detection system. The user interface can be presented at any number of local and/or remote devices for simultaneous use of zone detection system capabilities by multiple users. Such user capabilities include, but are not limited to, registering a new transmitter within the zone detection system and using the zone detection system to locate a registered transmitter.

Upon receipt, at step 810, of a request to register a transmitter via the user interface, the system controller receives and stores via the user interface, at step 812, transmitter common and unique codes. Next, at step 814, the system controller receives and stores via the user interface transmitter related attribute information pertaining to the group, individual or asset to which the transmitter is assigned. If the system controller determines, at step 816, that the common code is new to the zone detection system, the system controller sends, at step 818, an update message to each signal processing computer containing the new common code.

Upon receipt, at step 822, of a request to locate a specific transmitter or group of transmitters via the user interface, the system controller looks up, at step 824, common codes, unique codes and/or signal modulating codes in information store 610 (FIG. 6) associated with the identified transmitters for which a search is to be performed, and transmits, at step 826, a locate request to each signal processing computer for each transmitter to be located. Each locate request contains a common code/unique code combination and/or a signal modulating code associated with a transmitter for which the respective signal processing computers are to search.

Upon receiving from a signal processing computer, at step 830, information related to the detection of a common code within an RF-relay communication channel, the system controller looks up, at step 832, the related relay and common code in information store 610 (FIG. 6) to determine whether an alarm must be issued and to determine the nature and severity of the alarm to be issued. If the system controller determines, at step 834, that an alarm condition exists, the system controller issues, at step 836, an appropriate alarm response. Optionally, if the signal strength of the signal is received at step 830, the system controller can access the signal power signature data store 608 (FIG. 6) to determine an approximate location of the transmitter within the area supported by the identified RF-relay. Such refined location information is then used, when accessing information store 610 (FIG. 6), to determine whether an alarm must be issued and the nature/severity of the alarm to be issued.

Upon receiving from a signal processing computer, at step 840, information related to the detection of a specific signal modulating code in response to a locate request issued by the system controller (at step 826), the system controller stores, at step 842, the information received. If the system controller determines, at step 844, that all signal processing computers have responded to the issued locate request, indicating either failure or success, the system controller uses two-dimensional and/or three-dimensional correlation techniques to correlate, at step 846, any received signal strength information with information retrieved from the signal power signature data store and estimates, using statistical techniques, the location of the transmitter. Upon determining a best estimate of the transmitter, the system controller reports, at step 848, the location of the transmitter via the user interface.

A zone detection system, as described here, is ideal for use in monitoring assets/personnel in any monitored area, such as a shopping mall, prison, fairground, etc. For example, in a shopping mall environment, RF-relays are mounted throughout the mall corridors and shops so that the signal generated by a transmitter is received by at least one RF-relay device. Special care is taken, when placing RF-relay devices, to make sure that all mall exits and areas with special security requirements are fully covered. Processing requirements associated with restricted zone monitoring are reduced by scanning received signals for common codes associated with multiple transmitters supported by the zone detection system rather than scanning for each unique signal modulating code associated with each transmitter supported by the system. For example, in a system that supports a thousand transmitters, using a single common code reduces, by a factor of one thousand, the signal processing power required to monitor restricted areas (i.e., alert zones). Furthermore, only signals received from RF-relays associated with restricted areas need to be scanned, thereby reducing signal processing requirements even further. Upon determining that a transmitter is within a protected area, for which the transmitter's common code is not authorized, an appropriate alarm is raised.

The zone detection system, as described here, is also ideal for use in locating individual transmitters. Upon receiving a request from the system controller to locate one or more specific transmitters or multiple transmitters associated with a group, a signal processing computer need only sequentially filter incoming RF-relay signals, preferably using CDMA matched filter techniques, using a filter based upon the signal modulating code associated with each specific transmitter to be located. Therefore, regardless of the number of transmitters deployed within the monitored area, the signal processing power required to locate a single transmitter remains constant.

The present invention introduces a novel, highly efficient and modular approach to asset tracking and monitoring. By reducing processing loads, as described above, the present invention can support zone monitoring of an unlimited number of transmitters and location of specific transmitters without increasing signal processing requirements. To continuously monitor the movement of one or more transmitters, the system processing computer can be configured to repetitively locate a specific transmitter or multiple individual transmitters associated with a group, over time. If extensive transmitter tracking is required in a deployed environment, the capacity of signal processing computers can be increased, centrally, to accommodate the added signal processing load.

Although two-way communications between transmitters and the respective RF-relays can be used, the invention preferably uses low-cost one-way transmitters and receive-only RF-relays, thereby reducing deployed equipment complexity, cost, size and power requirements. By relying upon low-cost transmitters and low-cost RF-relays in the field and centralizing signal detection/processing functions, the zone detection system's processing capacity can be cost effectively tailored to meet the processing needs of a specific installation. Signal processing capacity of the zone detection system can be easily expanded by enhancing the capacity of the sector level signal processing computer(s) associated with the zone detection system without upgrading sub-sector level units. Optionally, load-sharing techniques can be used to further distribute signal processing loads across a large number of low cost signal processing computers. Preferably, the zone detection system described here, leverages known CDMA based technology to increase reliability, while reducing costs. Further, use of correlated power signature data allows the accuracy of location estimates to be increased without increasing a required number of deployed RF-relays.

Using the apparatus and methods described here, a zone detection system is achieved that reduces signal computer processing requirements associated with tracking individuals and/or assets within a monitored area, reduces the complexity of transmitters and required processing equipment, is modularly expandable with respect to both accuracy and area of coverage, is capable of locating, in a timely manner, a specific transmitter from a pool that includes an unlimited number of transmitters, regardless of shifts in the transmitter population within the monitored area, and is capable of efficiently monitoring restricted zones.

It will be appreciated that the embodiments described above and illustrated in the drawings represent only a few of the many ways of implementing a zone detection system. It is to be understood that various functions of the zone detection system components may be distributed in any manner among any quantity (e.g., one or more) of hardware and/or software modules or units, computer or processing systems or circuitry. The software and/or processes described above and illustrated in the flow charts and diagrams may be modified in any manner that accomplishes the functions described herein.

From the foregoing description it will be appreciated that the present invention includes a novel zone detection system and method of locating wireless transmitters that transmit signals modulated with a signal modulating code that is a combination of a common code and a unique code.

Having described preferred embodiments of a zone detection system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of monitoring a plurality of wireless transmitters within a monitored area, comprising:

(a) transmitting a signal from at least one of the plurality of wireless transmitters;

(b) receiving the signal transmitted from said at least one of the plurality of wireless transmitters by at least one of a plurality of receiving devices;

(c) scanning the received signal for a signal modulating code;

(d) detecting the signal modulating code within the signal; and (e) determining a location of said at least one of the plurality of wireless transmitters based upon the signal modulating code detected and an identifier for the at least one of the plurality of receiving devices that received the signal;

wherein the signal modulating code includes a common code that identifies a group of wireless transmitters that includes said at least one of the plurality of wireless transmitters and a unique code that uniquely identifies said at least one of the plurality of wireless transmitters; and wherein the common code of the signal modulating code is used to determine whether said at least one of the plurality of wireless transmitters is within an alert zone restricted to the group of wireless transmitters and the unique code of the signal modulating code is used to determine the location of said at least one of the plurality of wireless transmitters.

2. The method of claim 1, wherein the signal modulating code is a multiplexed combination of the common code and the unique code.

3. The method of claim 2, wherein in step (b) the receiving device is a signal relay and step (b) further includes:

(b1) relaying the received signal from the signal relay to a signal processing computer; and wherein in step (c) said scanning is performed by the signal processing computer.

4. The method of claim 3, wherein step (d) further includes:

(d1) upon detecting the signal modulating code, sending to a system controller a detection notification that includes said signal modulating code and an identifier of the signal relay that received the signal; and wherein step (e) further includes:

(e1) determining, at the system controller, the location of the transmitter based upon information received in at least one detection notification.

5. The method of claim 1, wherein in step (c) the signal is scanned using match filtering techniques.

6. The method of claim 5, wherein the matched filtering techniques use a matched filter that is based upon the common code portion of the signal modulating code.

7. The method of claim 6, wherein step (e) further includes:

(e1) determining that said one of the plurality of wireless transmitters is within an alert zone based upon the matched filter identifying the common code portion of the signal modulating code in a signal received by a receiving device associated with an alert zone;

(e2) issuing an alarm upon determining that the detected common code is not authorized for the alert zone.

8. The method of claim 7, wherein step (d) further includes:

(d1) determining a signal strength of the received signal; and wherein step (e) further includes:

(e3) refining the location of the transmitter based upon the signal strength of the received signal and a correlation of the signal strength with at least one pre-recorded signal strength value measured for a signal transmitted from a known location within the monitored area and received at the same receiving device as the received signal.

9. The method of claim 5, wherein the matched filter is based upon the signal modulating code.

10. The method of claim 1, wherein in step (c) the signal is scanned using CDMA match filtering techniques.

11. The method of claim 1, wherein step (d) further includes:

(d1) determining a signal strength of the received signal.

12. The method of claim 11, wherein in step (e) determining the location of the transmitter further includes:

(e1) refining the location of the transmitter based upon the signal strength of the received signal and a correlation of the signal strength with at least one pre-recorded signal strength value measured for a signal transmitted from a known location within the monitored area and received at the same receiving device as the received signal.

13. The method of claim 1, wherein step (d) further includes:

(d1) determining a signal strength of the signal detected using CDMA matched filter techniques.

14. A system for monitoring a plurality of wireless transmitters within a monitored area, the system comprising:

a plurality of wireless transmitters, each configured to transmit a signal modulated with a signal modulating code;

a signal relay that receives and relays a modulated signal from at least one of the plurality of wireless transmitters;

a signal processing computer that receives at least one signal from the signal relay, scans for the signal modulating code within the signal and transmits a detection notification that includes information about the signal; and a system controller that receives detection notifications from the signal processing computer and determines a location of said at least one of the plurality of wireless transmitters based upon information included within at least one detection notification;

wherein the signal modulating code includes a common code that identifies a group of wireless transmitters that includes said at least one of the plurality of wireless transmitters and a unique code that uniquely identifies said at least one of the plurality of wireless transmitters; and wherein the common code of the signal modulating code is used to determine whether said at least one of the plurality of wireless transmitters is within an alert zone restricted to the group of wireless transmitters and the unique code of the signal modulating code is used to determine the location of said at least one of the plurality of wireless transmitters.

15. The apparatus of claim 14, wherein the signal relay is configured to receive a CDMA signal from at least one of the plurality of wireless transmitters.

16. The apparatus of claim 14, wherein at least one of the plurality of wireless transmitters is configured to send a signal modulating code that is a time multiplexed combination of the common code and the unique code.

17. The apparatus of claim 14, wherein the signal processing computer is configured to scan the relayed signal using CDMA matched filter techniques.

18. The apparatus of claim 14, wherein the signal processing computer is configured to generate a detection notification that includes the received signal modulating code and an identifier for the signal relay that received the signal.

19. The apparatus of claim 18, wherein, upon detecting a signal modulating code, the signal processing computer is configured to determine a signal strength of the received signal.

20. The apparatus of claim 19, wherein the signal processing computer is configured to generate a detection notification that further includes the signal strength of the received signal.

21. The apparatus of claim 20, wherein the system controller is configured to refine a determined location by correlating signal strength information received in at least one detection notification with pre-recorded signal strength values measured for a signal transmitted from a known location within the monitored area and received at the same signal relay as the received signal.

22. The apparatus of claim 14, wherein the system controller is configured to determine whether said at least one of the plurality of wireless transmitters is in an alert area based upon the common code portion of the signal modulating code and the signal relay identifier received in at least one detection notification.

23. The apparatus of claim 14, wherein the system controller is configured to determine the location of said at least one of the plurality of wireless transmitters based upon the signal modulating code and the signal relay identifier received in at least one detection notification.

24. The apparatus of claim 14, wherein the system controller is configured to execute within the signal processing computer.

25. The apparatus of claim 14, wherein the signal relay is configured to relay the received signal to the signal processing computer via a cable based connection.

26. The apparatus of claim 14, wherein the signal relay is configured to relay the received signal to the signal processing computer via a wireless connection.

27. A wireless transmitter for use in a monitoring system that monitors a plurality of wireless transmitters within a monitored area, the wireless transmitter comprising:
- an information store that stores a common code assigned to the wireless transmitter;
- an information store that stores a unique code assigned to the wireless transmitter;
- a code generator that generates a signal modulating code based upon the stored common code and the stored unique code;
- a transmitter controller that controls transmission of a signal modulated with the generated signal modulating code; and
- an RF transmitter that broadcasts the signal to at least one monitoring system receiving device;
- wherein the common code identifies a group of wireless transmitters that includes the wireless transmitter and the unique code uniquely identifies the wireless transmitter; and
- wherein the monitoring system uses the common code portion of the signal modulating code to determine whether the wireless transmitter is within an alert zone restricted to the group of wireless transmitters and the monitoring system uses the unique code portion of the signal modulating code to determine a location of the wireless transmitter within the monitored area.

28. The apparatus of claim 27, wherein the code generator is configured to generate a signal modulating code that is a time multiplexed combination of the common code and the unique code.

29. The apparatus of claim 27, wherein the RF transmitter is configured to transmit continuously.

30. The apparatus of claim 27, wherein the transmitter is configured to transmit periodically.

31. The apparatus of claim 27, wherein the transmitter is configured to transmit a CDMA signal.

32. A signal processing computer for use in a monitoring system that monitors a plurality of wireless transmitters, the signal processing computer comprising:
- a channel communication interface that receives a signal, relayed via at least one signal receiving device, from at least one of the plurality of wireless transmitters;
- an analog-to-digital converter that digitizes the relayed signal;
- a signal detection module that scans the digitized signal for at least a portion of a signal modulating code;
- a signal processing controller that coordinates said digitization and scanning and controls transmission of a detection notification to a system controller; and
- a communication interface that transmits the detection notification to said system controller;
- wherein the signal modulating code includes a common code that identifies a group of wireless transmitters that includes said one of the plurality of wireless transmitters and a unique code that uniquely identifies said at least one of the plurality of wireless transmitters; and
- wherein the common code of the signal modulating code is used to determine whether said at least one of the plurality of wireless transmitters is within an alert zone restricted to the group of wireless transmitters and the unique code of the signal modulating code is used to determine the location of said at least one of the plurality of wireless transmitters.

33. The apparatus of claim 32, wherein the signal modulating code is a time multiplexed combination of the common code and the unique code.

34. The apparatus of claim 32, wherein the signal detection module is configured to scan the digitized signal using CDMA matched filter techniques.

35. The apparatus of claim 32, wherein upon detecting one of a common code and a unique code the signal detection module is configured to determine a signal strength of the received signal.

36. The apparatus of claim 32, wherein the signal processing controller is configured to generate a detection notification that includes an identifier for the signal receiving device that received the signal and at least one of a detected common code and a detected unique code.

37. The apparatus of claim 32, wherein the signal processing controller is configured to generate a detection notification that further includes the signal strength of the received signal.

38. A system controller for use in a monitoring system that monitors a plurality of wireless transmitters, the system controller comprising:
- an information store that associates a signal modulating code with each of the plurality of wireless transmitters;
- a communication interface that receives a detection notification from a signal processing computer that includes an identifier for a signal relay, that received a signal from one of the plurality of wireless transmitters and relayed the signal to the signal processing computer, and a signal modulating code detected within the received signal by the signal processing computer;
- a system controller module that stores information received in the detection notification and determines a location of said one of the plurality of wireless transmitters based upon information received via at least one detection notification; and
- a user interface that exchanges information related to operation of the monitoring system with a user;
- wherein the signal modulating code includes a common code that identifies a group of wireless transmitters that includes said one of the plurality of wireless transmitters and a unique code that uniquely identifies said one of the plurality of wireless transmitters; and
- wherein the common code of the signal modulating code is used to determine whether said one of the plurality of wireless transmitters is within an alert zone restricted to the group of wireless transmitters and the unique code of the signal modulating code is used to determine the location of said one of the plurality of wireless transmitters.

39. The apparatus of claim 38, wherein the system controller module is configured to determine whether a transmitter is located in an alert area based upon the common code portion of the signal modulating code, the signal relay identifier received in at least one detection notification and associations stored within the information store.

40. The apparatus of claim 38, wherein the system controller module is configured to determine the location of said one of the plurality of transmitters based upon the signal modulating code and the signal relay identifier received in at least one detection notification.

41. The apparatus of claim 38, wherein the communication interface is configured to receive a detection notification that further includes a signal strength of the received signal.

42. The apparatus of claim 41, further comprising:
a power signature information base that includes pre-recorded signal strength values measured for a signal transmitted from a known location within the monitored area and received at an identified signal relay.

43. The apparatus of claim 42 wherein the system controller module is configured to refine a determined location by correlating signal strength information received in at least one detection notification with pre-recorded signal strength values associated with signals received at the same signal relay as the received signal.

44. The apparatus of claim 38, wherein the system controller module is configured to execute within the signal processing computer.

* * * * *